US008936040B2

United States Patent
Tominaga et al.

(10) Patent No.: US 8,936,040 B2
(45) Date of Patent: Jan. 20, 2015

(54) SOLENOID VALVE (75) Inventors: Motonori Tominaga, Anjo (JP);
Masuhiro Kondoh, Obu (JP); Shinichi Tsujimura, Chiryu (JP); Yoshitada Katayama, Handa (JP)

(73) Assignees: Denso Corporation, Kariya (JP);
Nippon Soken, Inc., Nishio (JP); Advics Co., Ltd., Kariya (JP)

( * ) Notice: Subject to any disclaimer, the term of this patent is extended or adjusted under 35 U.S.C. 154(b) by 190 days.

(21) Appl. No.: 13/135,335

(22) Filed: Jul. 1, 2011

(65) Prior Publication Data
US 2012/0001107 A1    Jan. 5, 2012

(30) Foreign Application Priority Data
Jul. 5, 2010   (JP) .................................. 2010-153099

(51) Int. Cl.
| F16K 15/00 | (2006.01) |
| F16K 21/04 | (2006.01) |
| F16K 31/06 | (2006.01) |
| F16K 1/42  | (2006.01) |
| B60T 8/36  | (2006.01) |

(52) U.S. Cl.
CPC ................. F16K 1/42 (2013.01); B60T 8/3615 (2013.01); B60T 8/363 (2013.01)
USPC .................... 137/601.2; 251/129.02; 251/333

(58) Field of Classification Search
USPC .............. 251/129.02, 129.05, 333; 137/601.2
See application file for complete search history.

(56) References Cited

U.S. PATENT DOCUMENTS

| 1,822,668 | A  | * | 9/1931  | Protzeller ................. 251/129.18 |
| RE31,417  | E  | * | 10/1983 | Huber .................................. 137/1 |
| 4,646,976 | A  | * | 3/1987  | Rembold et al. ........... 239/585.3 |
| 5,056,556 | A  | * | 10/1991 | Nishimoto et al. .......... 137/522 |
| 5,443,309 | A  | * | 8/1995  | Beck .......................... 303/119.2 |
| 6,152,420 | A  | * | 11/2000 | Hohl ........................ 251/129.02 |
| 6,409,101 | B1 | * | 6/2002  | D'Arrigo .................... 239/585.1 |
| 6,565,017 | B1 | * | 5/2003  | Fath et al. .................. 239/533.3 |
| 6,722,586 | B2 | * | 4/2004  | Bonse et al. ................ 239/533.3 |
| 6,892,965 | B2 | * | 5/2005  | Haeberer et al. ......... 239/533.12 |
| 6,908,050 | B2 | * | 6/2005  | Sekine et al. .............. 239/585.1 |
| 7,832,653 | B2 | * | 11/2010 | Yukimoto .................... 236/92 B |
| 7,931,252 | B2 | * | 4/2011  | Shindo et al. ................. 251/333 |
| 2010/0006792 | A1 | * | 1/2010 | Shindo et al. ................. 251/359 |
| 2010/0051839 | A1 | * | 3/2010 | Guggenmos et al. .... 251/129.02 |

FOREIGN PATENT DOCUMENTS

| DE | 102006054185 | * | 5/2008 |
| JP | 8-105565     |   | 4/1996 |
| JP | 2002-347597  |   | 12/2002 |
| JP | 2005-308090  |   | 11/2005 |

* cited by examiner

*Primary Examiner* — Stephen M Hepperle
*Assistant Examiner* — Seth W MacKay-Smith
(74) *Attorney, Agent, or Firm* — Harness, Dickey & Pierce, PLC (57) ABSTRACT

A solenoid valve has a tapered valve seat disposed between a first flow passage and a second flow passage, a reduced diameter side of the valve seat that is connected with the first flow passage, and a valve body having a closing portion that reduces its diameter toward a tip facing the valve seat. The first flow passage and the second flow passage are connected/disconnected by sliding the valve body for contacting/detaching the closing portion to the valve seat, and a groove is disposed on the closing portion facing the direction of a fluid flow.

9 Claims, 6 Drawing Sheets

SOLENOID VALVE

CROSS-REFERENCE TO RELATED APPLICATION

This application is based on and claims the benefit of priority from earlier Japanese Patent Application No. 2010-153099 filed Jul. 5, 2010, the description of which is incorporated herein by reference.

TECHNICAL FIELD

The present disclosure relates to a solenoid valve that can connect and disconnect a first flow passage and a second flow passage by sliding a valve body, especially the solenoid valve suitable for use in an anti-lock brake circuit that avoids a locking tendency to wheels.

BACKGROUND

A various solenoid valve that has a valve seat disposed between a first flow passage and a second flow passage, and can connect and disconnect the first flow passage and the second flow passage by sliding a valve body for contacting/detaching a valve body to the valve seat is known so far.

For example, a permanently-opened type solenoid valve disclosed in Japanese Patent Application Laid-Open Publication No. 2002-347597 is known. This type of the solenoid valve has a moving core, which is attracted when a coil is energized, disposed in a bottomed cylindrical sleeve slidably.

A valve body is disposed so as to contact an end surface of the moving core, and the valve body slides in a direction where a valve seat is seated by energizing the coil.

Moreover, the valve body is forced to a direction away from the valve seat by an applied force of a spring, as well as a fluid that flows in from a first flow passage and acts onto the valve body in the direction away from the valve seat.

Moreover, in the solenoid valve of such a composition, a permanently-opened type differential-pressure-controlled solenoid valve that adjusts a differential pressure between upstream and downstream of the solenoid valve linearly by controlling an amount of energization of the coil is also known.

However, when adjusting the differential pressure using a size difference (large or small) of a gap between the valve body and the valve seat by balancing the electromagnetic force and the spring force by control the amount of energization of the coil in such the past solenoid valve, the size of the gap changes due to the sliding of the valve body even by a small change of the fluid pressure.

The fluid pressure changes especially at small/low flow rates or the differential pressure between upper and lower streams is small because the fluid that flows from the first flow passage to the second flow passage through the valve seat flows out while applying the fluid pressure to the tip of the valve body.

Thus problems such that the pressure control status becomes unstable and unable to adjust the differential pressure linearly for the amount of energization of the coil arise.

SUMMARY

An embodiment provides a solenoid valve to which the pressure control is kept steady even when a flowing amount or a differential pressure of fluid is small.

In a solenoid valve according to a first aspect, the solenoid valve includes a tapered valve seat disposed between a first flow passage and a second flow passage, a reduced diameter side of the valve seat that is connected with the first flow passage, and a valve body having a closing portion that reduces its diameter toward a tip facing the valve seat The first flow passage and the second flow passage are connected/disconnected by sliding the valve body for contacting/detaching the closing portion to the valve seat, and a groove is disposed on the closing portion facing the direction of a fluid flow.

The solenoid valve of the present disclosure, since the groove is disposed on the closing portion facing the direction of the fluid flow, the fluid pressure acts on the valve body when the flowing amount or the differential pressure is small, and the balancing electromagnetic force becomes large Therefore, the sliding of the valve body by the change of the fluid pressure becomes small, and the state of the pressure control becomes steady.

In the solenoid valve according to a second aspect, the valve body is urged towards the valve seat by an electromagnetic force energized to a coil and a force in a direction away from the valve seat by an applied force of a spring.

In the solenoid valve according to a third aspect, the closing portion is formed in a hemispherical shape, and the groove is formed to a side of the first flow passage from a contacting part where the closing portion contacts when seated onto the valve seat.

In the solenoid valve according to a fourth aspect, the groove is formed on the closing portion throughout a perimeter in a circumferential direction.

In the solenoid valve according to a fifth aspect, a plurality of grooves is formed on the closing portion.

In the solenoid valve according to a sixth aspect, the closing portion has the groove formed between a conical tip portion and a spherical rear end portion, and a geometric projection of a conical surface extended from the tip portion intersects a spherical surface of the rear end portion.

DETAILED DESCRIPTION OF THE PREFERRED EMBODIMENTS

With reference to the drawings, hereinafter will be described an embodiment of the present disclosure.

Figure 1:
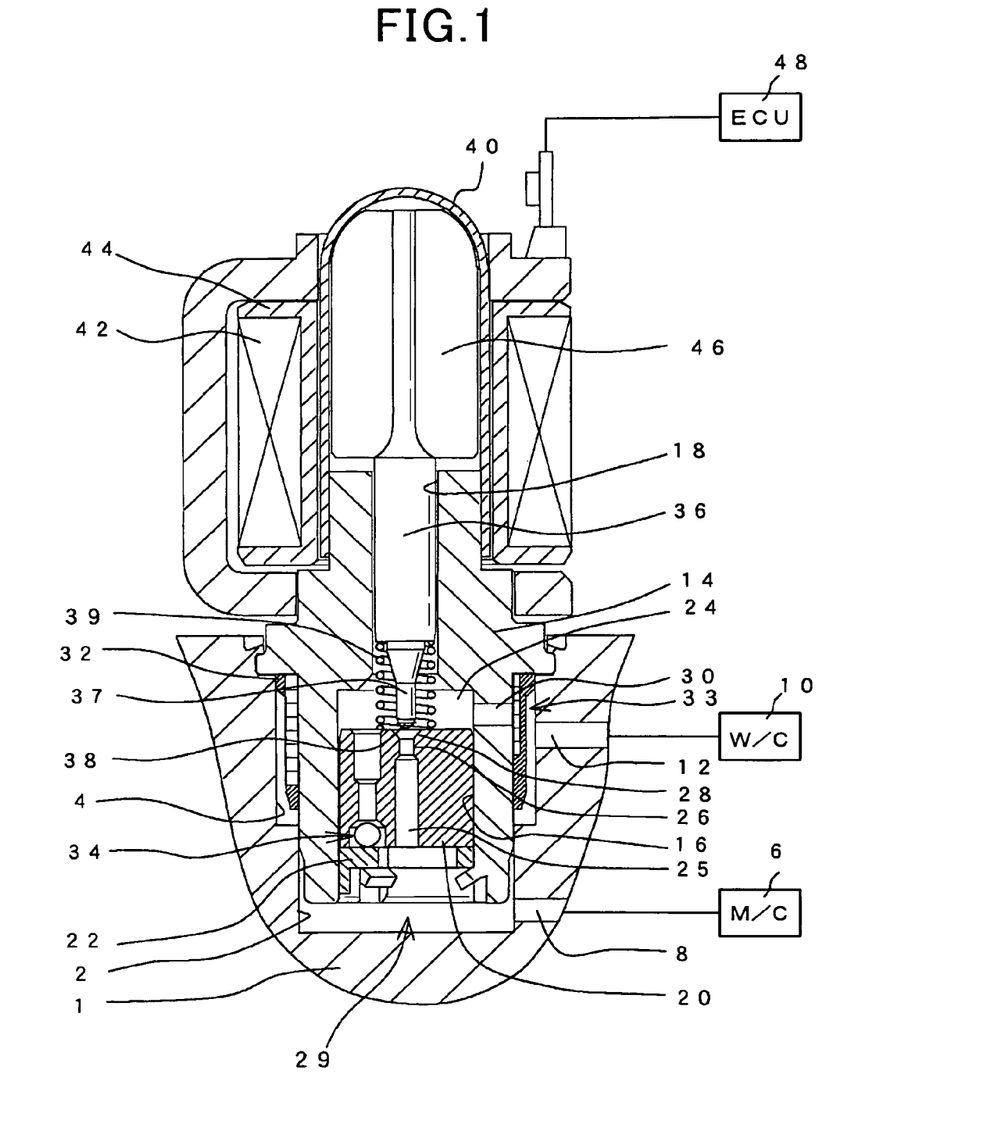
FIG. 1 shows a cross sectional view of a solenoid valve in a first embodiment of the present disclosure.

As shown in FIG. 1, an accommodation hole 2, and a large-diameter hole 4 that communicates with the accommodation hole 2 and opens to outside are formed in a main device body 1.

A first connection passage 8 connected with a master cylinder 6 is communicated to the accommodation hole 2, and a second connection passage 12 connected with a wheel cylinder 10 is communicated to the large-diameter hole 4.

A main valve body 14 is inserted into the accommodation hole 2. An installation hole 16 is formed in the main valve body 14 in an axial direction, while a sliding hole 18 that communicates with the installation hole 16 is formed coaxially.

The installation hole 16 opens to the accommodation hole 2, and a valve member 20 is press-fit to the installation hole 16, while a filter 22 is inserted into the installation hole 16 and supported in the main valve body 14 by crimping etc.

A communication chamber 24 is formed between a bottom of the installation hole 16 and the valve member 20.

In addition, a flow passage 25 is formed in the valve member 20 in an axial direction. The flow passage 25 opens to the accommodation hole 2 side, and is formed coaxially with the sliding hole 18. Moreover, a small flow passage 26 that communicates with the flow passage 25 is formed in the valve member 20.

A valve seat 28 is connected with the small flow passage 26, and the communication chamber 24 is communicated with the small flow passage 26 via the valve seat 28.

The valve seat 28 is formed in a tapered shape. A reduced diameter side of the valve seat 28 is connected with the small flow passage 26, and expands toward the communication chamber 24.

In the first embodiment, a first flow passage 29 is composed by the first connection passage 8, the accommodation hole 2, the installation hole 16, the flow passage 25, and the small flow passage 26.

A penetration passage 30 that communicates with the communication chamber 24 is formed on the main valve body 14 in a radial direction, while the communication chamber 24 is connected with the second connection passage 12 via the penetration passage 30 and a filter 32 disposed in the main valve body 14.

In the first embodiment, a second flow passage 33 is composed by the second connection passage 12, the large-diameter hole 4, the penetration passage 30, and the communication chamber 24.

It should be appreciated that a check valve 34 that allows the fluid flow from the communication chamber 24 to the accommodation hole 2 is disposed in the main valve body 14.

A valve body 36 is slidably inserted into the sliding hole 18, while a small-diameter part 37 is formed on the valve body 36 in the valve seat 28 side.

A closing portion 38 is formed on a tip of the small-diameter part 37, and the closing portion 38 is formed so that it is possible to be seated on the valve seat 28 by sliding the valve body 36.

A coil spring 39 is disposed between the valve body 36 and the valve member 20 coaxially with the small-diameter part 37, and applies a force to the closing portion 38 of the valve body 36 in a direction away from the valve seat 28.

A hollow cap member 40 is fixed to the main valve body 14, and a bobbin 44 where a coil 42 is provided is attached to an outer circumference of the cap member 40.

A movable core 46 is slidably inserted into the cap member 40 coaxially with the valve body 36.

When the coil 42 is excited by an excitation command from an electronic control unit (ECU) 48 connected with the coil 42, the movable core 46 is attracted into the main valve body 14, and the movable core 46 slides toward the main valve body 14 by attraction force, pushes the valve body 36 to the valve seat 28 in the direction for seating, and the valve body 36 is seated on the valve seat 28.

On the other hand, the closing portion 38 on a tip side of the valve body 36 is formed facing to the valve seat 28.

Figure 2A:
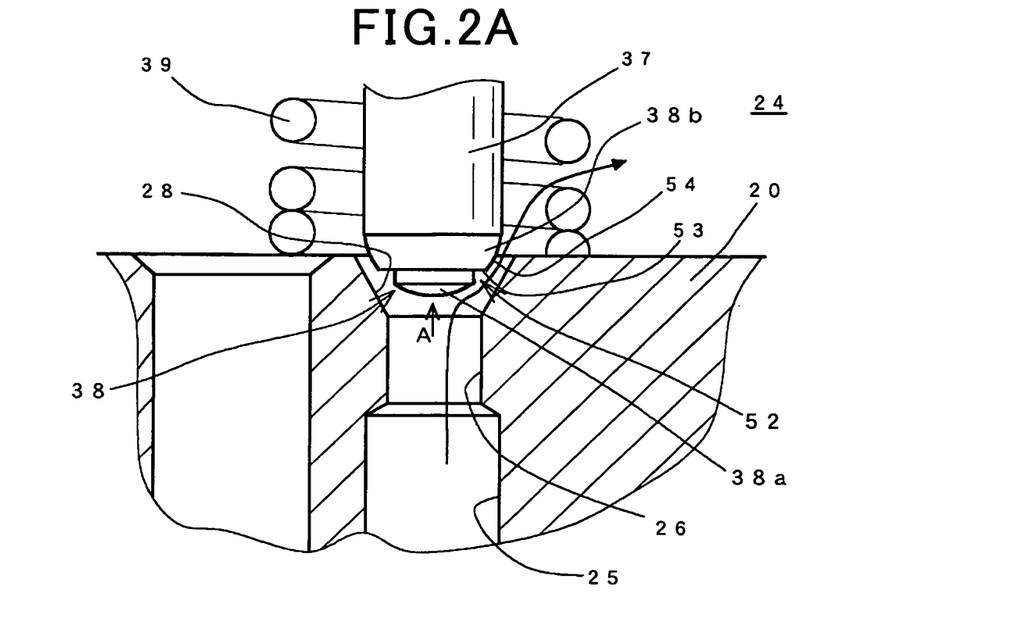
FIGS. 2A and 2B show enlarged partial views of principle parts of the first embodiment.
Figure 2B:
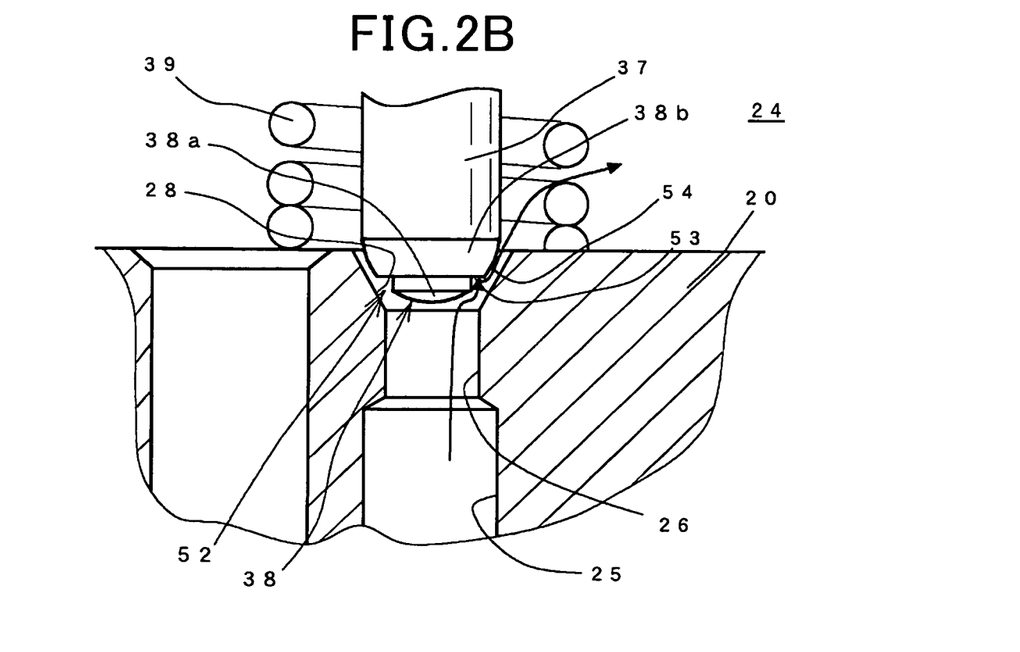
Figure 3:
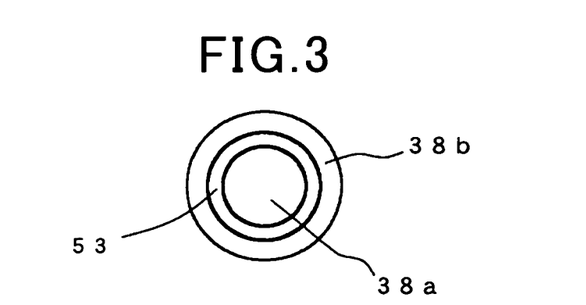
FIG. 3 shows an enlarged view of a valve body seen from a direction of arrow A in FIG. 2.

In the first embodiment, the closing portion 38 is formed in a hemispherical shape, and a groove 52 is formed on the hemispheric closing portion 38, as shown in FIG. 2.

When the closing portion 38 is seated on the tapered valve seat 28, the closing portion 38 and the valve seat 28 are line-contacted at a contacting part 54.

The groove 52 is formed in the hemispheric closing portion 38, while the groove 52 is formed to the side of the small flow passage 26 from the contacting part 54 where the closing portion 38 contacts when seated onto the valve seat 28.

Moreover, in the first embodiment, the groove 52 is formed in an annular shape throughout a perimeter in a circumferential direction, and the groove 52 is formed facing the fluid that flows in from the small flow passage 26.

A bottom of the groove 52 is formed flat, and an effecting surface 53 is formed thereon perpendicular to an axial direction of the closing portion 38.

In the first embodiment, the closing portion 38 is formed in the hemispherical shape with a constant radius, and the groove 52 is formed in the hemispheric closing portion 38.

The groove 52 is formed between a tip portion 38a and a rear end portion 38b of the hemispherical closing portion 38, and it is formed so that a part of a hemisphere may remain in the tip portion 38a.

Further, the closing portion 38 is formed so that when a hemispheric surface of the tip portion 38a is extended, the extended geometric projection of a surface contacts a hemispheric surface of the rear end portion 38b.

As shown in FIG. 2A, when an interval between the closing portion 38 and the valve seat 28 is large and a flowing velocity of the fluid that flows in from the small flow passage 26 is high, the fluid flows along the hemispheric surface of the closing portion 38 and flows from the tip portion 38a to the rear end portion 38b of the closing portion 38 as jumping over the groove 52.

Moreover, as shown in FIG. 2B, when the interval between the closing portion 38 and the valve seat 28 is small and the flowing velocity of the fluid that flows in from the small flow passage 26 is low, the fluid flows towards the effecting surface 53 of the groove 52 from the hemispheric surface of the closing portion 38, and the fluid pressure acts to the valve body 36 in the direction away from the valve seat 28.

Figure 4A:
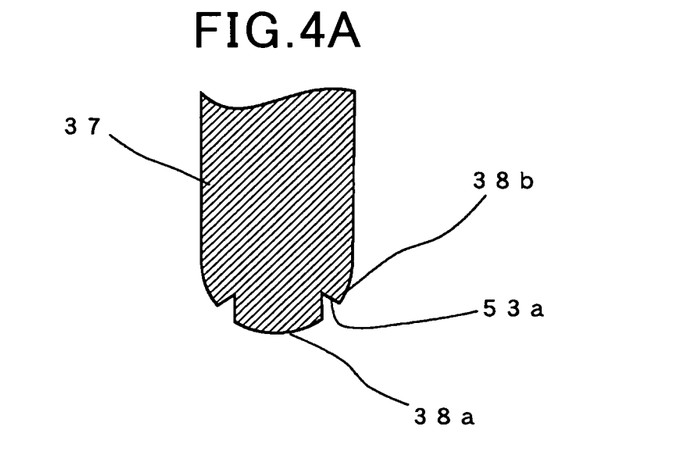
FIGS. 4A and 4B show the enlarged sectional views of a closing portion that is provided with a groove of another shape in the first embodiment.
Figure 4B:
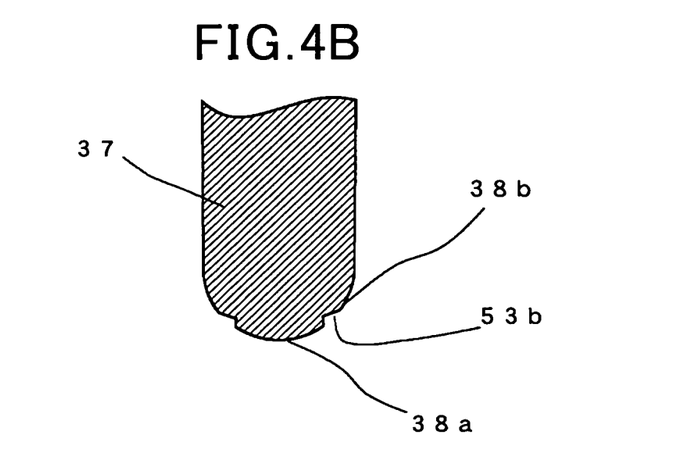

The effecting surface 53 is not limited to be formed perpendicular to the axial direction of the closing portion 38, but may be formed so that an effecting surface 53a forms an acute angle in the axial direction of the closing portion as shown in FIG. 4A, or may be formed so that an effecting surface 53a forms an obtuse angle in the axial direction of the closing portion 38 as shown in FIG. 4B.

Moreover, the effecting surface 53 is not limited to be flat, but it is possible to form a curved surface with an arc-shaped groove 52 thereon.

Next, the operation of the solenoid valve in the above-mentioned first embodiment is explained.

First, the first flow passage 29 and the second flow passage 33 are communicated when the interval between the closing portion 38 and the valve seat 28 is widened by separating the closing portion 38 from the valve seat 28 by sliding the valve body 36 by the applied force of the coil spring 39 without exciting the coil 42.

By this, when a brake is stepped on, the fluid is supplied to the small flow passage 26 from the master cylinder 6 via the first connection passage 8, the accommodation hole 2, the installation hole 16, and the flow passage 25.

Moreover, as shown in FIG. 2A, the fluid flows into the communication chamber 24 through the space between the coil springs 39 from the small flow passage 26 after passing between the closing portion 38 and the valve seat 28.

The fluid flows out from the communication chamber 24 to the second connection passage 12 through the penetration passage 30, the filter 32, and the large-diameter hole 4, and is supplied to the wheel cylinder 10 to operate the brakes.

However, when the stepping of the brake is released, the fluid is returned from the wheel cylinder 10 to the master cylinder 6 through the second flow passage 33, the valve seat 28, and the first flow passage 29.

When the fluid passes the space between the closing portion 38 and the valve seat 28 from the small flow passage 26, the differential pressure between upstream and downstream of the valve seat 28 is large, and the flow velocity of the fluid is high.

Therefore, the fluid flows along the hemispheric surface of the closing portion 38 as shown by an arrow A in FIG. 2A, and flows from the tip portion 38a to the rear end portion 38b of the closing portion 38 as jumping over the groove 52.

As a result, the fluid pressure of the fluid that collides to the effecting surface 53 is small, and the electromagnetic force that slides the valve body 36 is suppressed to grow by exciting the coil 42 when seating the closing portion 38 to the valve seat 28.

Moreover, the ECU 48 controls an anti-lock brake operation that avoids a locking tendency of the wheels (not shown) based on a driving state.

In that case, the ECU 48 performs a decompression control, a maintenance control, and a control of increasing pressure, and controls the fluid pressure of the wheel cylinder 10. The change of the control will be frequently performed in a short period of time.

When the anti-lock brake operation such as the maintenance control etc. is controlled, the ECU 48 outputs the excitation command to the coil 42, and by the electromagnetic force of the coil 42, the movable core 46 is attracted to the valve body 36.

Then the closing portion 38 is pushed to the direction where the valve seat 28 to be seated resisting the applied force of the coil spring 39 by the valve body 36 moved by the movable core 46.

As a result, the closing portion 38 is seated on the valve seat 28 and intercepts the first flow passage 29 and the second flow passage 33, thus the valve is closed.

Therefore, since the master cylinder 6 and the wheel cylinder 10 are intercepted and the fluid of the wheel cylinder 10 is released while maintaining the pressure of the master cylinder, the braking pressure can be reduced.

In addition, when the ECU 48 controls the anti-lock brake operation, the ECU 48 calculates an exciting current to the coil 42 based on a slip ratio etc., and outputs the calculated exciting current to the coil 42.

The coil 42 attracts the movable core 46 into the valve body 36 by the electromagnetic force according to the exciting current.

Then the closing portion 38 is pushed to the direction where the valve seat 28 to be seated resisting the applied force of the coil spring 39 by the valve body 36 moved by the movable core 46.

When the movable core 46 is attracted according to the exciting current and is balanced with the applying power of the coil spring 39, a small gap is made between the closing portion 38 and the valve seat 28, as shown in FIG. 2B.

The fluid flows from the small flow passage 26 into the communication chamber 24 via this gap.

When at the time of the maintenance control etc., the differential pressure between upstream and downstream of the valve seat 28 is small, and the flow velocity of the fluid that passes the gap between the closing portion 38 and the valve seat 28 is also low. When the fluid flows from the small flow passage 26 into the communication chamber 24, the fluid flows into the gap between the closing portion 38 and the valve seat 28 along the tip portion 38a of the closing portion 38.

Further, as shown by the arrow in FIG. 2B, the fluid enters into the groove 52 from the tip portion 38a and collides to the effecting surface 53, and at this time the valve body 36 is pushed in the direction away from the valve seat 28 by the fluid pressure.

After the fluid is collided to the effecting surface 53, the fluid flows from the gap between the rear end portion 38b and the valve seat 28 into the communication chamber 24.

Thus, since the groove 52 is disposed on the closing portion 38 facing the direction of the fluid flow, the fluid pressure acts on the valve body 36 when the flowing amount or the differential pressure is small, and the balancing electromagnetic force becomes large.

Therefore, the sliding of the valve body 36 by the change of the fluid pressure becomes small, and the state of the pressure control becomes steady. As a conclusion, the flowing amount proportional to the exciting current can be easily obtained.

In addition, the differential pressure can be adjusted linearly for the amount of energization of the coil 42.

Moreover, the sealing ability can be secured and the groove 52 can be formed easily by forming the closing portion 38 in the hemispheric shape.

It should be appreciated that the closing portion 38 is not limited to the hemispheric shape, but a rotating parabolic shape or conical shape is acceptable.

Figure 5:
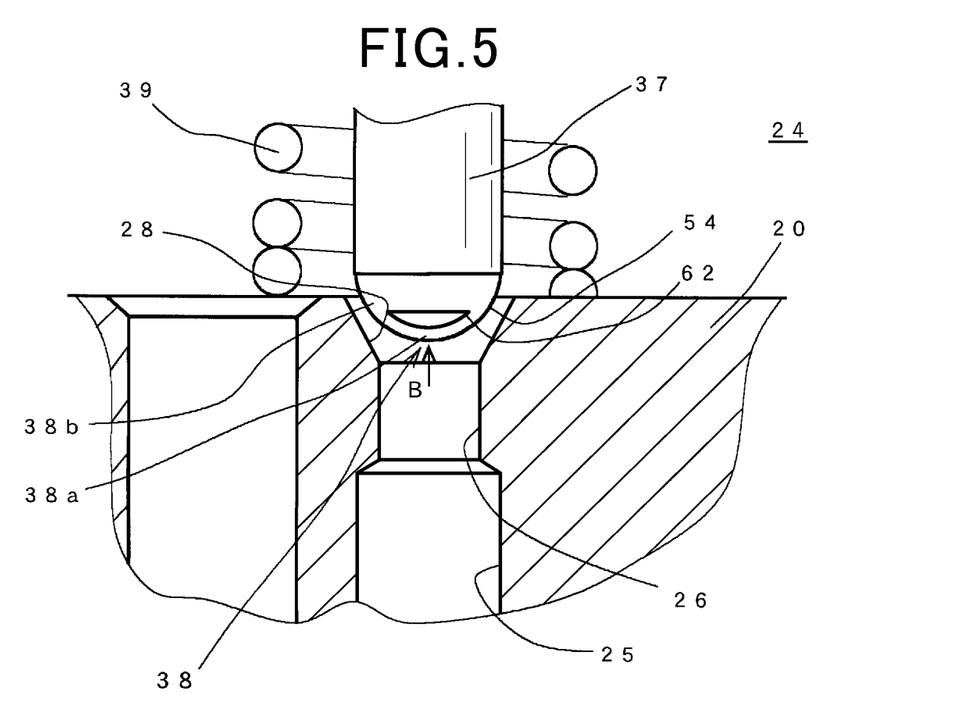
FIG. 5 shows an enlarged view of a principle part including a closing portion that it provided with two grooves in the first embodiment.
Figure 6:
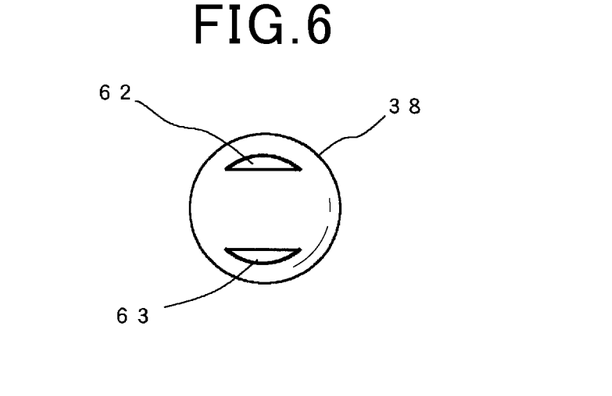
FIG. 6 shows an enlarged view of the valve body seen from the direction of arrow B in FIG. 5.

Although the above-mentioned groove 52 is formed throughout the perimeter in the circumferential direction of the closing portion 38, it is not limited so, and as shown in FIG. 5 and FIG. 6, two grooves 62 and 63 may be formed on the same plane between the tip portion 38a and the rear end portion 38b of the closing portion 38 linearly in a symmetrical position.

Figure 7:
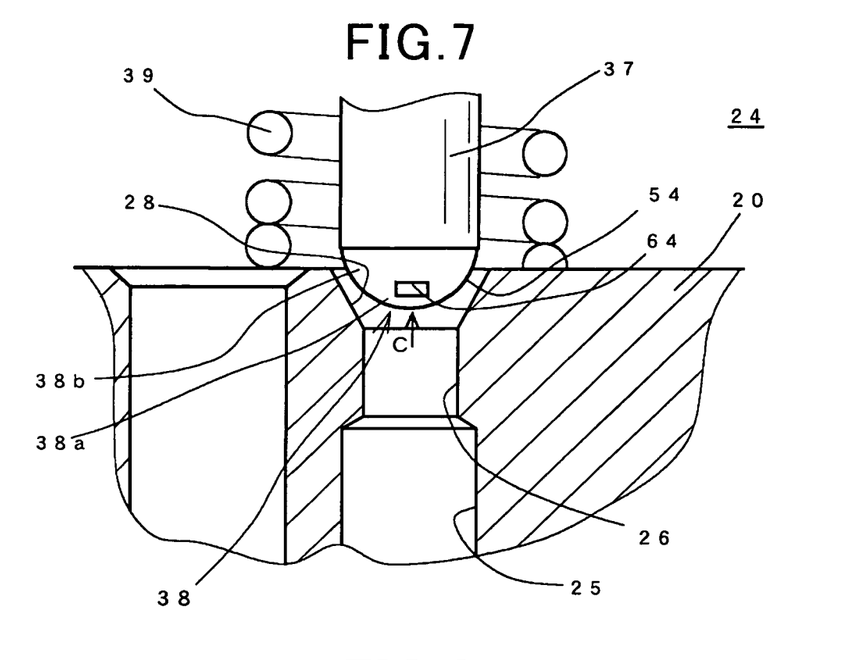
FIG. 7 shows an enlarged view of a principle part including a closing portion that is provided with four grooves in the first embodiment.
Figure 8:
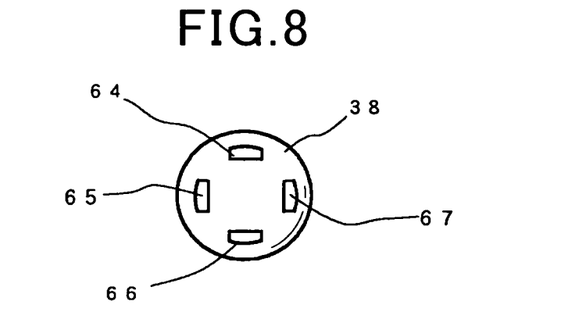
FIG. 8 shows an enlarged view of the valve body seen from the direction of arrow C in FIG. 7.

In addition, as shown in FIG. 7 and FIG. 8, four grooves 64, 65, 66 and 67 may be formed on the same plane between the tip portion 38a and the rear end portion 38b of the closing portion 38 linearly in a symmetrical position.

Figure 9A:
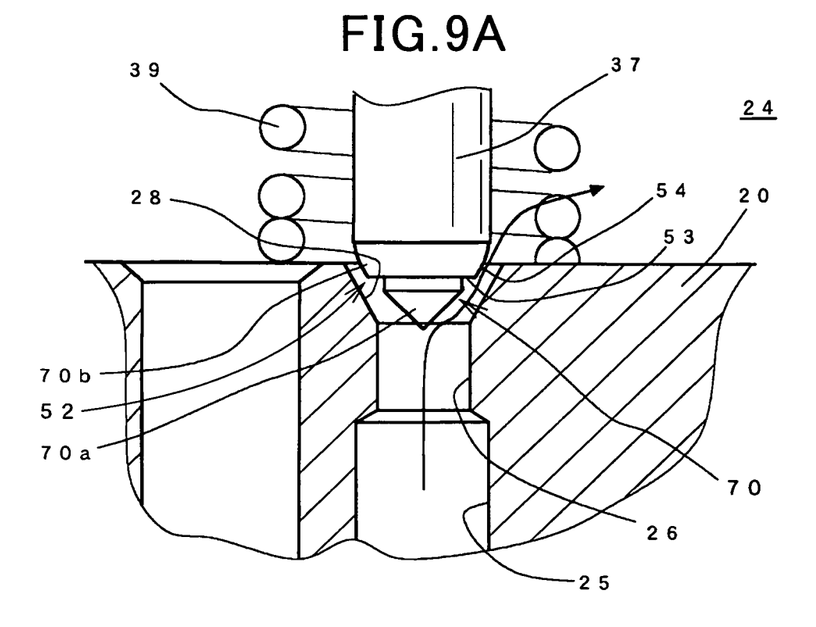
FIGS. 9A and 9B show enlarged views of principle parts of a second embodiment.
Figure 9B:
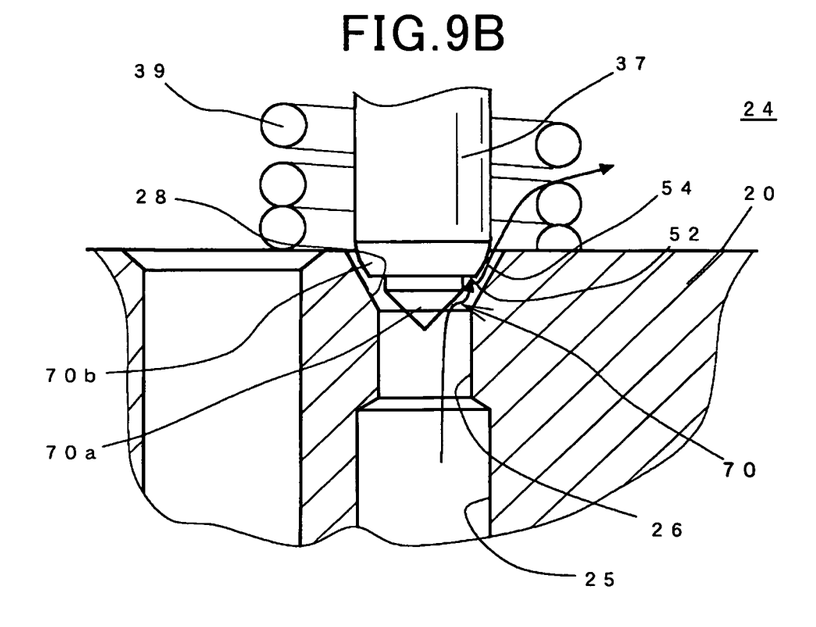

Next, a second embodiment that is different from the above-mentioned first embodiment is explained by using FIG. 9.

In the second embodiment, the identical or similar components to those in the first embodiment are given the same reference numerals for the sake of omitting unnecessary explanation.

In the second embodiment, the shape of the closing portion 38 of the valve body 36 is different from that of the first embodiment, and a closing portion 70 of the valve body 36 in the second embodiment is provided with a tip portion 70a that is formed in a conical shape.

The groove 52 is formed on the communication chamber 24 side from the tip portion 70a side.

A rear end portion 70b that has a spherical curved surface is formed on the closing portion 70 in the communication chamber side from the groove 52.

The shape of each conical shape and spherical shape is decided so that when a conical outer surface of the tip part 70a is extended, the geometric projection of the conical surface intersects the hemispherical periphery of the rear end portion 70b substantially at an outer edge of the groove 52.

The groove 52 is formed on the small flow passage 26 side from the contacting part 54 where the closing portion 70 contacts when seated onto the valve seat 28.

Further, the groove 52 is formed in an annular shape throughout a perimeter in a circumferential direction, and the groove 52 is formed facing the fluid that flows in from the small flow passage 26.

In the second embodiment, as shown in FIG. 9A, when an interval between the closing portion 70 and the valve seat 28 is large and a flowing velocity of the fluid that flows in from the small flow passage 26 is high, the fluid flows along the hemispheric surface of the closing portion 70 and flows from the tip portion 70a to the rear end portion 70b of the closing portion 70, jumping over the groove 52, like in the first embodiment.

Moreover, as shown in FIG. 9B, when the interval between the closing portion 70 and the valve seat 28 is small and the flowing velocity of the fluid that flows in from the small flow passage 26 is low, the fluid flows as if to collide with the effecting surface 53 of the groove 52 from the hemispheric surface of the closing portion 70, and the fluid pressure acts to the valve body 36 in the direction away from the valve seat 28.

Therefore, the fluid pressure acts on the valve body 36 when the flowing amount or the differential pressure is small, and the balancing electromagnetic force becomes large as in the first embodiment.

Therefore, the sliding of the valve body 36 by the change of the fluid pressure becomes small, and the state of the pressure control becomes steady. As a conclusion, the flowing amount proportional to the exciting current can be easily obtained.

The present is not limited to such embodiments mentioned above, but may be practiced in various modes within the range in which it does not deviate from the scope of the present disclosure.

What is claimed is:

1. A solenoid valve comprises:
a tapered valve seat disposed between a first flow passage and a second flow passage;
a reduced diameter side of the valve seat that is directly open to the first flow passage;
a valve body having a hemispheric closing portion that reduces its diameter toward a tip facing the valve seat;
a spring disposed between the tapered valve seat and the valve body, the spring urging the closing portion of the valve body in a direction away from the valve seat to open the solenoid valve to allow fluid flow from the first flow passage to the second flow passage, the solenoid valve moving the valve body against the valve seat when the solenoid valve is energized, the energizing of the solenoid overcoming the urging of the spring to close the solenoid valve; and
a check valve separate from the valve body, the check valve allowing fluid flow from the second flow passage to the first flow passage and prohibiting fluid flow from the first flow passage to the second flow passage; wherein
the first flow passage and the second flow passage are connected and disconnected by sliding the valve body for contacting and separating the closing portion to the valve seat,
a groove is formed in the hemispheric closing portion and is formed between the tip of the hemispheric closing portion facing the first flow passage and a contacting part where the closing portion contacts the valve seat when seated onto the valve seat;
a direction of fluid flow is from the first flow passage to the second flow passage.

2. The solenoid valve according to claim 1, wherein, the groove is formed on the closing portion throughout a perimeter in a circumferential direction.

3. The solenoid valve according to claim 1, wherein, a plurality of grooves are formed on the closing portion.

4. The solenoid valve according to claim 1, wherein, the closing portion has the groove formed between a conical tip portion and a spherical rear end portion, and a geometric projection of a conical surface extended from the tip portion intersects a spherical surface of the rear end portion.

5. The solenoid valve according to claim 1, wherein the groove is open to the first flow passage when the hemispheric closing portion of the valve body contacts the valve seat.

6. The solenoid valve according to claim 5, wherein the groove defines a planar surface extending in a radial direction of the valve body and a cylindrical surface perpendicular to the planar surface.

7. The solenoid valve according to claim 1, wherein the groove defines a planar surface extending in a radial direction of the valve body and a cylindrical surface perpendicular to the planar surface.

8. The solenoid valve according to claim 1, wherein the check valve is disposed in the valve seat.

9. The solenoid valve according to claim 1, wherein, the groove defines a cylindrical surface extending in an axial direction of the valve body and a planar surface extending from the cylindrical surface of the groove to the hemispheric closing portion; and
the fluid flow from the first flow passage directly impacts the planar surface extending from the cylindrical surface of the groove to the hemispheric closing portion.

* * * * *